Patented Sept. 6, 1927.

1,641,804

UNITED STATES PATENT OFFICE.

MELVIN DE GROOTE, OF ST. LOUIS, AND WILBUR C. ADAMS, OF UNIVERSITY CITY, MISSOURI, ASSIGNORS TO WM. S. BARNICKEL & COMPANY, OF WEBSTER GROVES, MISSOURI, A CORPORATION OF MISSOURI.

PROCESS FOR BREAKING PETROLEUM EMULSIONS.

No Drawing. Application filed August 11, 1926. Serial No. 128,707.

This invention relates to the treatment of emulsions of mineral oil and water, such as petroleum emulsions, for the purpose of separating the oil from the water.

Petroleum emulsions are of the water-in-oil type and comprise fine droplets of naturally occurring waters or brines dispersed in a more or less permanent state throughout the oil which constitutes the continuous phase of the emulsion. They are obtained from producing wells and from the bottoms of oil storage tanks and are commonly referred to as "cut oil", "roily oil", "emulsified oil", and "bottom settlings".

The object of our invention is to provide a novel process for breaking or separating such petroleum emulsions which is distinguished from prior chemical processes heretofore used for breaking such emulsions, in that it contemplates subjecting the emulsion to the action of a treating agent consisting of a condensation product containing a sulphonated, polycyclic, aromatic and two soap-forming radicals chemically combined.

One method that can be employed to produce the treating agent used in our process consists in preparing a sulphonated, polycyclic, aromatic soap-forming acid such as a Twitchell reagent, in the usual manner, then mixing said reagent with an equal amount of a fatty body or soap-forming body such as hydroxystearic acid, and thereafter heating said mixture. As is well understood in this art, the term "Twitchell reagents" is generally used to designate sulpho-aromatic soap-forming acids containing one soap-forming carboxyl group for each aromatic radical and it is in this sense that we have herein used the term "Twitchell reagents", such materials or reagents being usually obtained by sulphonating an aromatic and a soap-forming body in molecular proportions by means of sulphuric acid in excess.

In producing the treating agent contemplated by our process any suitable soap-forming material or detergent-forming material may be used, and accordingly, we have herein used the expression "detergent-forming material" to indicate both modified and unmodified fatty bodies, rosins and naphthenic bodies, such as oleic acid, rosins, naphthenic acids and materials of the organic groups that are capable of combining with alkali to form soaps and which have the ability to form detergents even after modification by means of a chemical reagent, provided the modified substance bears a simple genetic relationship to the parent material from which it was derived. We have also herein used the term "sulphonated polycyclic aromatic detergent-forming acid" to mean a body of acidic character having a polycyclic aromatic radical and a sulphonic radical or radicals, and a detergent-forming radical of the kind previously noted.

The compounds, used as the treating agent in our process and characterized by having two soap-forming carboxyl groups united with one sulpho-aromatic, are identified, because they can be extracted with the petroleum ether without yielding a great deal of fatty substances. Moreover, when titrated with alkali to the methyl orange and phenolphthalein end points, the second titration is twice the first, indicating two carboxyls to one sulpho-aromatic. Of course, if a di-sulphonic acid is present proper allowances must be made. We have found that it is not always necessary to have an hydroxy body for combination, but that an unsaturated body, such as oleic acid, is entirely satisfactory. In this case the acid hydrogen of the sulphonic acid, especially when a di-sulphonic acid such as di-sulpho-naphthalene stearate is used, appears to saturate the double bond of the oleic acid and a compound is formed the same way so as to produce a substance having two soap-forming carboxyls for one sulphonated aromatic radical. Accordingly, in producing the treating agent contemplated by our process we prefer to combine the naphthalene with a suitable glyceride, especially under such conditions as to produce some di-sulphonic naphthalene fatty acid together with the mono-acid, and subsequently, mix the same with a suitable soap-forming body.

While the distinguishing characteristic of the compound used as the treating agent in our process is that it consists of a combination of a polycyclic aromatic radical and sulphonic group or groups and two soap-forming radicals, so combined that there is present two carboxyl groups for each sulpho-aromatic group in a molecule, we prefer to prepare said compound by sulphonating the polycyclic aromatic and the glycerides such as naphthalene and castor oil so as to produce partly mono and partly disulpho naphthalene, modified ricinoleic acid and then mix the same with a molecular proportion of half oleic acid and half hydroxy stearic acid. The compound, so produced, after allowing for subsidiary substances which naturally occur in large scale manufacture, gives a most excellent yield of an agent that can be used successfully for breaking or separating petroleum emulsions. The above described material can be used as an ester or a water-soluble or water-insoluble salt, but we prefer to use the alkali metal salts, such as sodium, potassium or ammonium. These materials can be used alone or in combination with other suitable chemical treating agents and they can be used in diluted form or in undiluted form.

In practising our process the treating agent or compound above described is brought in contact with an emulsion either by introducing the treating agent into a well in which the petroleum emulsion is being produced; introducing the treating agent into a conduit through which a petroleum emulsion is flowing; introducing the treating agent into a tank in which a petroleum emulsion is stored, or introducing the treating agent into a container that holds sludge obtained from the bottom of an oil storage tank. The treating agent can even be introduced into a producing well in such a way that it can become mixed with water or oil that is emerging from the ground before said water and oil enter the barrel of the well pump or the tubing up through which said water and oil flow to the surface of the ground. After any of the various treatments above referred to the emulsion is allowed to stand in a quiescent state at a suitable temperature so as to permit the water or brine to separate from the oil, or it may be passed through a variety of apparatus, such as hay tanks, gun barrels, etc., such as are now commonly used for "breaking" petroleum emulsions. It may even be passed through a heating apparatus, a centrifugal or an electrical dehydrator, or an emulsifying device, with or without the addition of water to the emulsion, or it may be subjected to action by a combination of two or more of the devices above referred to.

Having thus described our invention, what we claim as new and desire to secure by Letters Patent is:

1. A process for breaking or separating petroleum emulsions, characterized by subjecting the emulsion to the action of a condensation product containing two soap-forming radicals and a sulphonated polycyclic aromatic chemically combined.

2. A process for breaking or separating petroleum emulsions, characterized by subjecting the emulsion to the action of a condensation product containing the salts of two soap-forming radicals and a sulphonated polycyclic aromatic chemically combined.

3. A process for breaking or separating petroleum emulsions, characterized by subjecting the emulsion to the action of a condensation product containing the water-soluble salts of two soap-forming radicals and a sulphonated polycyclic aromatic chemically combined.

4. A process for breaking or separating petroleum emulsions, characterized by subjecting the emulsion to the action of a condensation product containing the ammonium salts of two soap-forming radicals and a sulphonated polycyclic aromatic chemically combined.

5. A process for breaking or separating petroleum emulsions, characterized by subjecting the emulsion to the action of a condensation product containing a sulphonated polycyclic aromatic group and fatty groups so combined that there are two carboxyls for each sulphonated polycyclic aromatic.

6. A process for breaking or separating petroleum emulsions, characterized by subjecting the emulsion to the action of a condensation product containing the salts of a sulphonated polycyclic aromatic group and fatty groups so combined that there are two carboxyls for each sulphonated polycyclic aromatic.

7. A process for breaking or separating petroleum emulsions, characterized by subjecting the emulsion to the action of a condensation product containing the water-soluble salts of a sulphonated polycyclic aromatic group and fatty groups so combined that there are two carboxyls for each sulphonated polycyclic aromatic.

8. A process for breaking or separating petroleum emulsions, characterized by subjecting the emulsion to the action of a condensation product containing the ammonium salts of a sulphonated polycyclic aromatic group and fatty groups so combined that there are two carboxyls for each sulphonated polycyclic aromatic.

9. A process for breaking or separating petroleum emulsions, characterized by subjecting the emulsion to the action of a condensation product containing two fatty groups and a sulpho-naphthalene group chemically combined.

10. A process for breaking or separating petroleum emulsions, characterized by subjecting the emulsion to the action of a condensation product containing the salts of two fatty groups and a sulpho-naphthalene group chemically combined.

11. A process for breaking or separating petroleum emulsions, characterized by subjecting the emulsion to the action of a condensation product containing the water-soluble salts of two fatty groups and a sulphonaphthalene group chemically combined.

12. A process for breaking or separating petroleum emulsions, characterized by subjecting the emulsion to the action of a condensation product containing the ammonium salts of two fatty groups and a sulphonaphthalene group chemically combined.

MELVIN DE GROOTE.
WILBUR C. ADAMS.